Patented Feb. 11, 1941

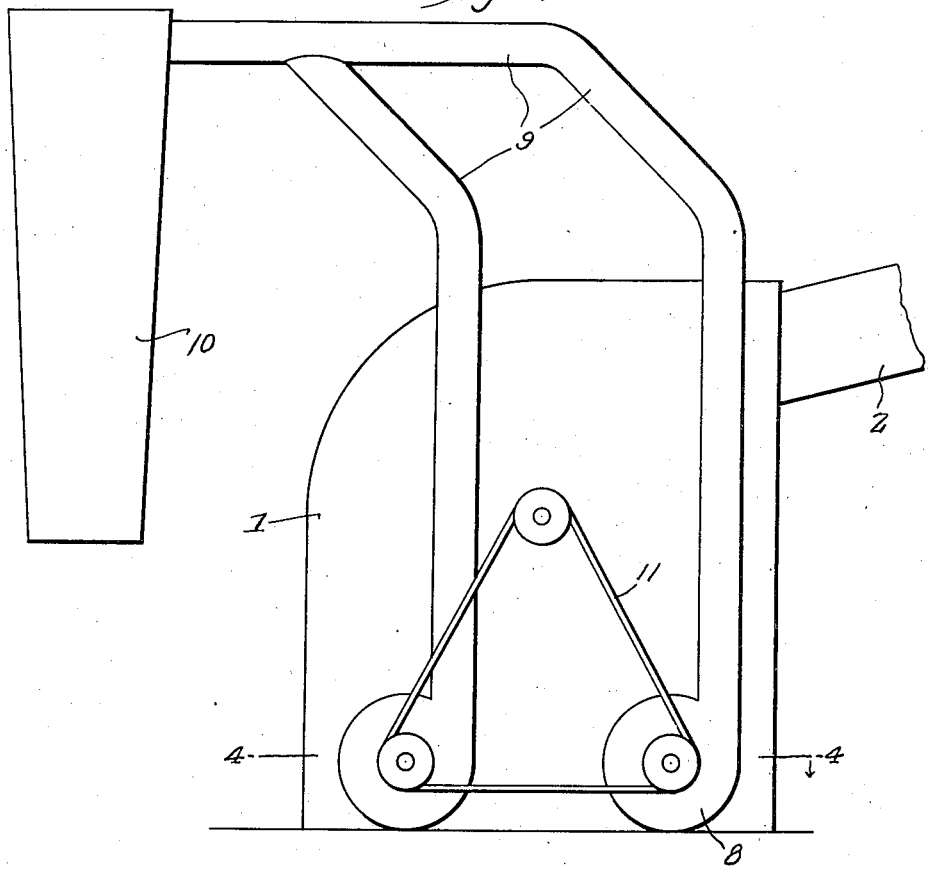
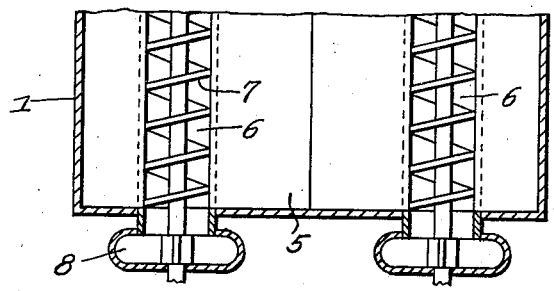

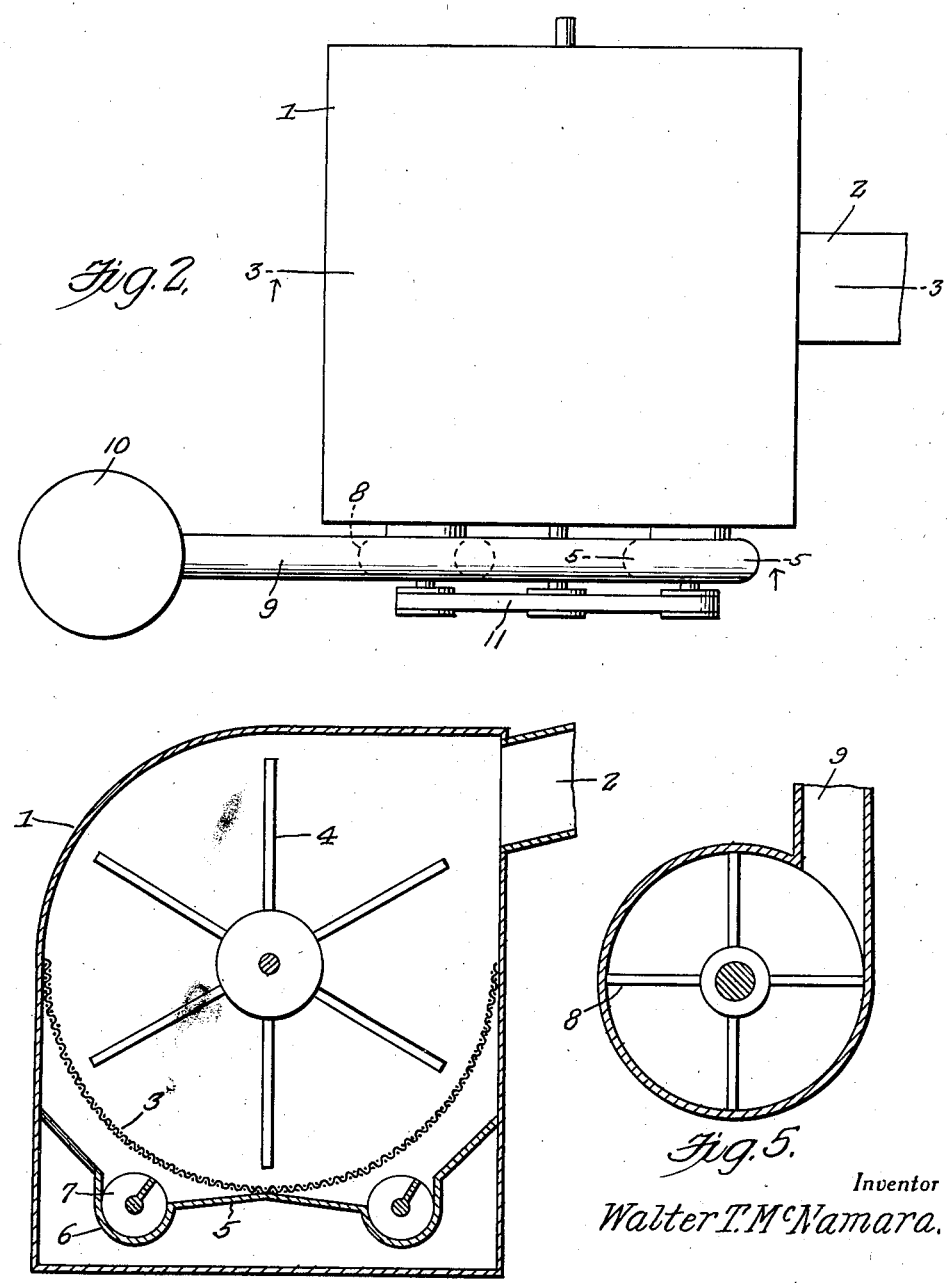

2,231,814

UNITED STATES PATENT OFFICE 2,231,814

FEED MILL

Walter T. McNamara, Norway, Iowa

Application June 12, 1939, Serial No. 278,799

1 Claim. (Cl. 83—11)

The present invention relates to new and useful improvements in feed mills and has for its primary object to provide, in a manner as hereinafter set forth, a machine of this character comprising dual means for moving the ground feed from the bottom of the box to the dust or feed collector.

Other objects of the invention are to provide a feed mill of the aforementioned character which will be comparatively simple in construction, strong, durable, highly efficient and reliable in operation, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of a feed mill constructed in accordance with the present invention.

Figure 2 is a top plan view thereof.

Figure 3 is a view in vertical longitudinal section, taken substantially on the line 3—3 of Fig. 2.

Figure 4 is a fragmentary view in horizontal section, taken substantially on the line 4—4 of Fig. 1.

Figure 5 is a vertical sectional view through one of the fans, taken substantially on the line 5—5 of Fig. 2.

Referring now to the drawings in detail, it will be seen that the embodiment of the invention which has been illustrated comprises a box 1 which is provided with a feed intake 2. In the lower portion of the box 1 is a substantially semicylindrical screen 3. Operable in the box 1 above the screen 3 is a rotary beater or agitator 4.

The bottom 5 of the box 1 has formed therein a pair of spaced, parallel troughs 6 in which worm conveyors 7 are mounted for operation. It will be observed that the portion of the bottom 5 which extends between the troughs 6 is substantially anticlinal. The worm conveyors 7 are adapted to deliver the feed to a pair of centrifugal fans or blowers 8 which are mounted on one side of the box 1. This is illustrated to advantage in Figs. 2 and 4 of the drawings.

Conduits 9 connect the fans 8 to a conventional collector 10. As best seen in Fig. 1 of the drawings, the beater 4 and the fans 8 are connected for operation in unison through the medium of a belt-and-pulley drive 11.

It is thought that the operation of the machine will be readily apparent from a consideration of the foregoing. Briefly, the ground feed passes through the screen 3 and gravitates to the troughs 6 in which it is carried to the fans 8 by the worm conveyors 7. The feed is then blown by the fans 8 through the conduits 9 to the collector 10. Of course, the machine may be driven from any suitable source of power.

It is believed that the many advantages of a feed mill constructed in accordance with the present invention will be readily understood and although a preferred embodiment of the machine is as illustrated and described, it is to be understood that changes in the details of construction and in the combination and arrangement of parts may be resorted to which will fall within the scope of the invention as claimed.

What is claimed is:

A feed mill of the character described comprising in combination, a box having an inlet opening in one side near the top thereof, the opposite side of said box being arcuately shaped, said box having a bottom, said bottom being formed of two spaced parallel troughs and of portions inclined downwardly toward said troughs, centrifugal fans mounted on one side of the box and communicating with the troughs, a beater rotatably mounted in the box between the inlet and arcuately shaped side of the box, a screen mounted in the box below the beater, a pair of worm conveyors operable in the troughs for delivering feed to the fans, discharge conduits leading from said fans and means operatively connecting the beater and the fans together for operation in unison.

WALTER T. McNAMARA.